(12) United States Patent
Ikemiya et al.

(10) Patent No.: US 9,683,772 B2
(45) Date of Patent: Jun. 20, 2017

(54) CONTAINER REFRIGERATION SYSTEM (75) Inventors: Makoto Ikemiya, Osaka (JP); Kazuma Yokohara, Osaka (JP); Hisaaki Takaoka, Osaka (JP); Masaaki Takegami, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 507 days.

(21) Appl. No.: 13/496,426

(22) PCT Filed: Sep. 16, 2010

(86) PCT No.: PCT/JP2010/005663
§ 371 (c)(1),
(2), (4) Date: Mar. 15, 2012

(87) PCT Pub. No.: WO2011/033779
PCT Pub. Date: Mar. 24, 2011

(65) Prior Publication Data
US 2012/0167605 A1    Jul. 5, 2012

(30) Foreign Application Priority Data

Sep. 16, 2009 (JP) ................................ 2009-214978
Dec. 25, 2009 (JP) ................................ 2009-295825

(51) Int. Cl.
F25B 1/00 (2006.01)
F25B 49/00 (2006.01)
F25D 11/00 (2006.01)
B60H 1/32 (2006.01)

(52) U.S. Cl.
CPC ......... *F25D 11/003* (2013.01); *B60H 1/3232* (2013.01); *B60H 2001/3292* (2013.01)

(58) Field of Classification Search
CPC  B60H 1/32; B60H 1/3232; B60H 2001/3293; F25B 27/00; F25B 1/00; F25D 11/00
USPC ........ 62/323.1, 323.3, 134, 230, 243, 228.1, 62/228.4, 222
See application file for complete search history.

(56) References Cited

U.S. PATENT DOCUMENTS

| 4,789,025 A | 12/1988 | Brandemuehl et al. |
| 4,875,341 A | 10/1989 | Brandemuehl et al. |
| 2005/0278040 A1 | 12/2005 | Itoh et al. |

(Continued)

FOREIGN PATENT DOCUMENTS

| EP | 1790921 A1 | 5/2007 |
| EP | 1 796 255 A1 | 6/2007 |
| EP | 1950509 A1 | 7/2008 |

(Continued)

OTHER PUBLICATIONS

Kitagishi et al., Compressor Operation Control Device and Air Conditioner Using the Same, Apr. 2, 2009, WO2009041075A1, Whole Document.*

*Primary Examiner* — Larry Furdge
(74) *Attorney, Agent, or Firm* — Birch, Stewart, Kolasch & Birch, LLP (57) ABSTRACT

A refrigeration apparatus controller calculates a refrigeration load of a refrigeration apparatus, and a load signal (S) containing load information indicating a magnitude of the refrigeration load is output from a communication device to an engine controller. The engine controller controls a speed of rotation of a generator engine based on the load signal (S).

6 Claims, 6 Drawing Sheets (56) References Cited

U.S. PATENT DOCUMENTS

2009/0025410 A1* 1/2009 Tanaka et al. ............... 62/228.1
2009/0133419 A1   5/2009 Matsuno et al.

FOREIGN PATENT DOCUMENTS

| | | | |
|---|---|---|---|
| JP | 1-167564 A | 7/1989 | |
| JP | 4-124547 A | 4/1992 | |
| JP | 7-285325 A | 10/1995 | |
| JP | 2002-150395 A | 5/2002 | |
| JP | 2002-318026 A | 10/2002 | |
| JP | 2003-114068 A | 4/2003 | |
| JP | 2004-316934 A | 11/2004 | |
| JP | 2006-23069 A | 1/2006 | |
| JP | 2007-113874 A | 5/2007 | |
| JP | 2007-192170 A | 8/2007 | |
| JP | 2008-128616 A | 6/2008 | |
| JP | WO 2009041075 A1 * | 4/2009 | ............ F24F 11/008 |
| JP | 2010-185611 A | 8/2010 | |
| WO | WO 2005/124988 A1 | 12/2005 | |

* cited by examiner

CONTAINER REFRIGERATION SYSTEM

TECHNICAL FIELD

The present invention relates to container refrigeration systems.

BACKGROUND ART

Refrigeration apparatuses for cooling frozen food items etc. in transporting the items by land or sea have been known. Such a refrigeration apparatus includes a compressor and an evaporator, and air cooled in the evaporator is fed to a container as taught by, for example, Patent Document 1. The compressor of the refrigeration apparatus is driven by power generated by a diesel generator. The diesel generator is driven by a generator engine to generate power. Refrigeration capacity of the refrigeration apparatus is controlled by adjusting the degree of opening of a proportional inlet valve provided in a pipe on an inlet side of the compressor.

CITATION LIST

Patent Document

[Patent Document 1] Japanese Patent Publication No. H01-167564

SUMMARY OF THE INVENTION

Technical Problem

The above-described refrigeration apparatus consumes a great amount of energy. Specifically, a low speed engine is generally used as the diesel generator. The engine of the diesel generator keeps driving at a relatively high speed of rotation even when the refrigeration apparatus is stopped or a refrigeration load is reduced. Thus, the diesel generator wastefully consumes energy, thereby making the entire refrigeration system less energy efficient.

In view of the foregoing, the present invention has been achieved. The present invention is directed to a container refrigeration system which is driven by an engine to generate power, and feeds the generated power to a refrigeration apparatus, and is concerned with making the container refrigeration system more energy efficient.

Solution to the Problem

The present invention is directed to a container refrigeration system including: a generator engine (21) for driving a power generator (22); a refrigeration apparatus (11) for cooling an inside of a container (C); a refrigeration apparatus controller (31) for controlling operation of the refrigeration apparatus (11); a converter (23) for converting alternating current power generated by the power generator (22) to direct current power; and an inverter (24) for converting the direct current power of the converter (23) to the alternating current power, and feeding the alternating current power to the refrigeration apparatus (11) through a power line (35). The present invention has the following feature.

Specifically, according to a first aspect of the invention, the container refrigeration system includes an engine controller (25) for controlling a speed of rotation of the generator engine (21) based on a signal (S) containing load information indicating a magnitude of a refrigeration load of the refrigeration apparatus (11).

In the first aspect of the invention, the power (alternating current power) generated by the power generator (22) driven by the generator engine (21) is fed to the refrigeration apparatus (11) through the converter (23) and the inverter (24). This drives an electric compressor (12) etc. of the refrigeration apparatus (11) to cool the inside of the container (C).

When the signal (S) containing the load information indicating the magnitude of the refrigeration load of the refrigeration apparatus (11) calculated from a temperature inside the container (C), an outdoor temperature, etc. is input to the engine controller (25), the engine controller (25) controls the speed of rotation of the generator engine (21) based on the signal (S), and the power generator (22) only generates power appropriate to the refrigeration load of the refrigeration apparatus (11).

Specifically, when the refrigeration load of the refrigeration apparatus (11) increases, the speed of rotation of the generator engine (21) increases to allow the power generator (22) to generate more power appropriate to the increased refrigeration load. When the refrigeration load of the refrigeration apparatus (11) decreases, the speed of rotation of the generator engine (21) decreases to allow the power generator (22) to generate less power appropriate to the decreased refrigeration load.

In this structure, the speed of rotation of the generator engine (21) can be controlled based on the signal (S) containing the load information indicating the magnitude of the refrigeration load of the refrigeration apparatus (11), and the generator engine (21) can be driven by the power appropriate to the refrigeration load. This can prevent the generator engine (21) from being driven by power higher than necessary, although the refrigeration load of the refrigeration apparatus (11) is low. Thus, waste of fuel by the generator engine (21) can be prevented, and the generator engine (21) can be more energy efficient. This can make the entire system more energy efficient.

According to a second aspect of the invention related to the first aspect of the invention, the engine controller (25) includes a determination section (27) which determines whether or not the signal (S) containing the load information readable by the engine controller (25) is sent from the refrigeration apparatus controller (31), and the engine controller (25) is configured to control the speed of rotation of the generator engine (21) based on the signal (S) when the determination section (27) determines that the readable signal (S) has been sent.

In the second aspect of the invention, the engine controller (25) includes the determination section (27). The determination section (27) determines whether or not the signal (S) containing the load information readable by the engine controller (25) has been sent from the refrigeration apparatus controller (31).

When the determination section (27) determines that the readable signal (S) has been sent from the refrigeration apparatus controller (31), the engine controller (25) controls the speed of rotation of the generator engine (21) based on the signal (S).

In this structure, the speed of rotation of the generator engine (21) can be controlled based on the readable signal (S) sent from the refrigeration apparatus controller (31), and the generator engine (21) can be driven by the power appropriate to the refrigeration load.

Specifically, the refrigeration apparatus controller (31) receives a target temperature, an indoor temperature, an outdoor temperature, a temperature of a discharge pipe of an electric compressor (12), etc., to calculate the refrigeration load of the refrigeration apparatus (11) based on the temperatures. When the refrigeration apparatus controller (31) includes a communication device (32), the signal (S) containing the load information is sent to the engine controller (25). Then, when the engine controller (25) has read the load information from the signal (S), the determination section (27) determines that the readable signal (S) has been sent. The speed of rotation of the generator engine (21) is then controlled based on the signal (S), and the power generator (22) only generates power appropriate to the refrigeration load of the refrigeration apparatus (11).

According to a third aspect of the invention related to the second aspect of the invention, the engine controller (25) is configured to control the speed of rotation of the generator engine (21) based on an output of the inverter (24) when the determination section (27) determines that the readable signal (S) has not been sent.

In the third aspect of the invention, when the determination section (27) determines that the readable signal (S) has not been sent, the engine controller (25) controls the speed of rotation of the generator engine (21) based on the output of the inverter (24).

In this structure, the speed of rotation of the generator engine (21) can be controlled based on the output of the inverter (24), and the generator engine (21) can be driven by the power appropriate to the refrigeration load.

Specifically, the determination section (27) determines that the readable signal (S) has not been sent when the refrigeration apparatus controller (31) does not include the communication device (32) for sending the signal (S) to the engine controller (25), or when the engine controller (25) is not able to read the load information from the signal (S) sent from the refrigeration apparatus controller (31). In this case, the output of the inverter (24) can be regarded as the refrigeration load of the refrigeration apparatus (11), and the speed of rotation of the generator engine (21) can be controlled based on the refrigeration load.

According to a fourth aspect of the invention related to the first aspect of the invention, the engine controller (25) is configured to activate the generator engine (21) upon receiving a request to activate the refrigeration apparatus (11), and to start feeding of power to the refrigeration apparatus (11) after a predetermined delay time has elapsed.

In the fourth aspect of the invention, the engine controller (25) activates the generator engine (21) upon receiving the request to activate the refrigeration apparatus (11). Then, the power is fed to the refrigeration apparatus (11) after the predetermined delay time has elapsed.

In this structure, stable power can be fed to the refrigeration apparatus (11) only after the generator engine (21) is activated, and the power generated by the power generator (22) is stabilized. The delay time may be set by a timer in advance, or may be determined based on time taken for the output to reach ±5% of a target voltage, or time taken for the speed of rotation of the generator engine (21) to reach ±5% of the target speed of rotation, etc.

According to a fifth aspect of the invention related to the first aspect of the invention, the refrigeration apparatus (11) includes an electric compressor (12) driven by an output of the inverter (24), and the refrigeration apparatus controller (31) is configured to gradually increase an operating frequency of the electric compressor (12) after receiving a request to activate the refrigeration apparatus (11).

In the fifth aspect of the invention, the refrigeration apparatus (11) includes the electric compressor (12) which is driven by the output of the inverter (24). The refrigeration apparatus controller (31) gradually increases the operating frequency of the electric compressor (12) after receiving the request to activate the refrigeration apparatus (11).

In this structure, the refrigeration apparatus (11) can be operated while keeping the output of the electric compressor (12) low until the power generated by the power generator (22) is stabilized after the generator engine (21) is activated upon receiving the request to activate the refrigeration apparatus (11).

According to a sixth aspect of the invention related to the first aspect of the invention, the refrigeration apparatus (11) includes a proportional control valve (18) for adjusting an amount of a refrigerant circulating in a refrigerant circuit (5), and the refrigeration apparatus controller (31) is configured to gradually increase the amount of the circulating refrigerant by adjusting a degree of opening of the proportional control valve (18) after receiving a request to activate the refrigeration apparatus (11).

In the sixth aspect of the invention, the refrigeration apparatus (11) includes the proportional control valve (18) for adjusting the amount of the refrigerant circulating in the refrigerant circuit (5). The refrigeration apparatus controller (31) adjusts the degree of opening of the proportional control valve (18) after receiving the request to activate the refrigeration apparatus (11). Thus, the amount of the circulating refrigerant gradually increases.

In this structure, the refrigeration apparatus (11) can be operated while keeping the amount of the refrigerant circulating in the refrigerant circuit (5) small until the power generated by the power generator (22) is stabilized after the generator engine (21) is activated upon receiving the request to activate the refrigeration apparatus (11).

According to a seventh aspect of the invention related to the first aspect of the invention, the refrigeration apparatus (11) includes an electric compressor (12) driven by an output of the inverter (24), and the refrigeration apparatus controller (31) is configured to gradually reduce an operating frequency of the electric compressor (12) when the output of the inverter (24) exceeds a predetermined threshold.

In the seventh aspect of the invention, the refrigeration apparatus (11) includes the electric compressor (12) driven by the output of the inverter (24). The refrigeration apparatus controller (31) reduces the operating frequency of the electric compressor (12) when the output of the inverter (24) exceeds the predetermined threshold.

This structure can prevent abnormal increase in speed of rotation of the generator engine (21), and can prevent stall and stop of the generator engine (21), even when the output of the generator engine (21) is reduced through transportation at high altitudes or degradation over time.

Specifically, when the container (C) is transported at high elevations (highland), the output of the generator engine (21) is reduced due to lack of oxygen. The output of the generator engine (21) is also reduced through degradation over time. In such cases, the speed of rotation of the generator engine (21) is increased to produce a predetermined output (i.e., to allow the power generator (22) to output the power appropriate to the refrigeration load). When the output is still insufficient, the generator engine (21) starts to stall (the speed of rotation starts to decrease), and eventually stops. This disadvantageously stops the operation of the refrigeration apparatus (11).

According to the present invention, when the output of the inverter (24) is higher than the predetermined threshold, the operating frequency of the electric compressor (12) is reduced, thereby reducing the refrigeration capacity of the refrigeration apparatus (11), and reducing the refrigeration load. This can reduce power required by the power generator (22), and can reduce power required by the generator engine (21), thereby reducing the speed of rotation of the generator engine (21). Thus, even when the output of the generator engine (21) is reduced through transportation at high altitudes or degradation over time, the abnormal increase in speed of rotation of the generator engine (21) can be prevented, and the stall and stop of the generator engine (21) can be prevented.

Advantages of the Invention

According to the present invention, the speed of rotation of the generator engine (21) is controlled based on the readable signal (S) sent from the refrigeration apparatus controller (31), and the generator engine (21) can be driven by the power appropriate to the refrigeration load. This can prevent the generator engine (21) from being driven by power higher than necessary, although the refrigeration load of the refrigeration apparatus (11) is low. Thus, waste of fuel by the generator engine (21) can be prevented, and the generator engine (21) can be more energy efficient. This can make the entire system more energy efficient.

DESCRIPTION OF EMBODIMENTS

Embodiments of the present invention will be described with reference to the drawings. The following preferable embodiments will be described merely for the purposes of preferred examples in nature, and are not intended to limit the scope, applications, and use of the invention.

First Embodiment

Figure 1:
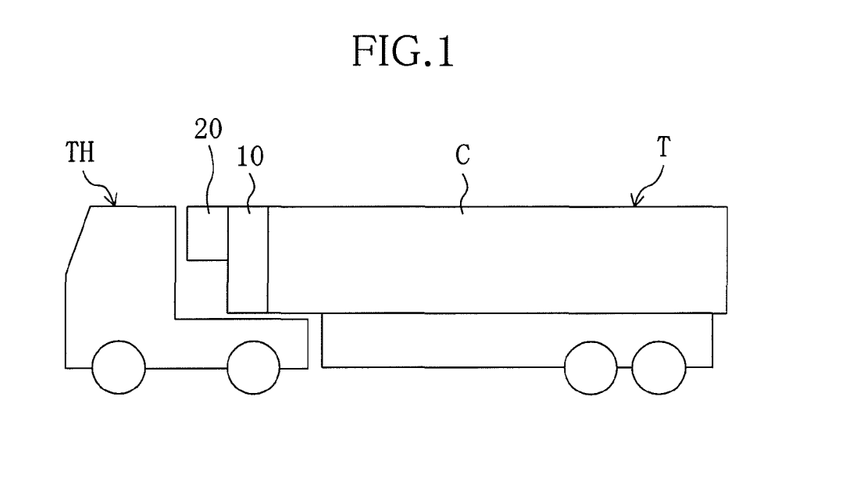
FIG. 1 is a left side view of a refrigerator car provided with a container refrigeration system according to a first embodiment of the present invention.
Figure 2:
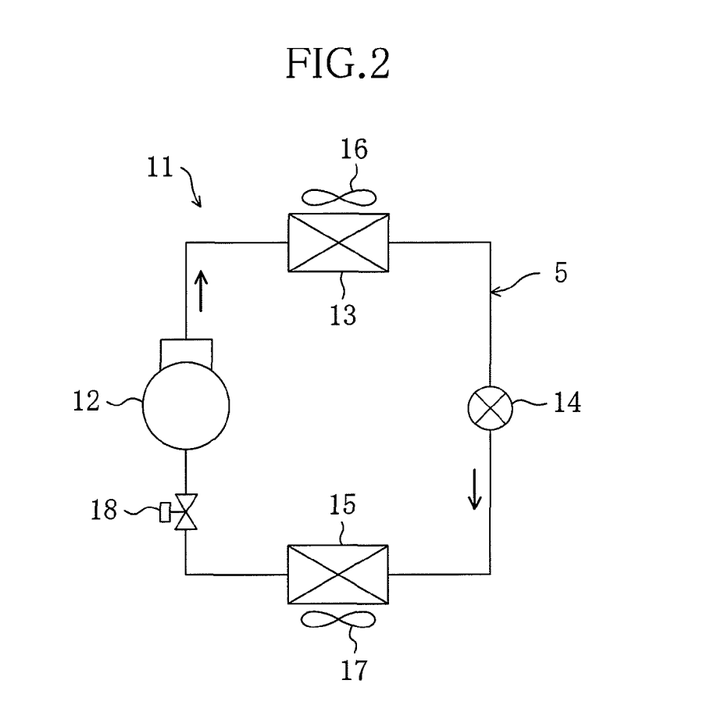
FIG. 2 is a piping diagram of a refrigerant circuit of a refrigeration apparatus.
Figure 3:
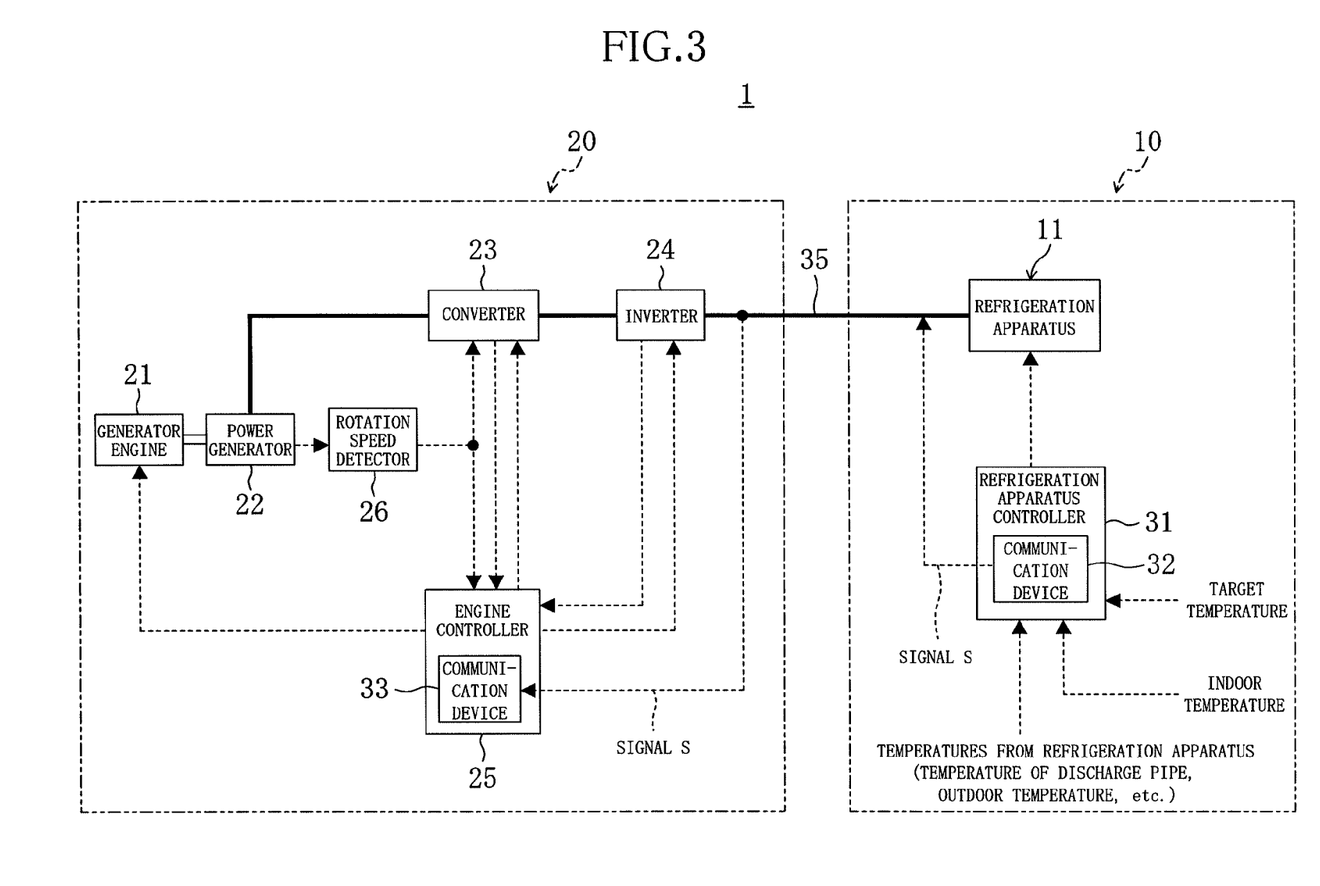
FIG. 3 is a schematic diagram of a general structure of the refrigeration system.

As shown in FIGS. 1-3, a container refrigeration system (1) of a first embodiment includes a refrigeration unit (10) having a refrigeration apparatus (11) for cooling a container (C) (inside of the container), and an engine-generator unit (20) for generating power for driving the refrigeration apparatus (11). The refrigeration unit (10) and the engine-generator unit (20) are connected to each other through a power line (35).

As shown in FIG. 1, the refrigeration unit (10) is used in a refrigerator car for transporting frozen or perishable food items etc. by land. The refrigerator car includes a trailer head (TH) as a powered vehicle including a driver's cab and a drive engine, and a trailer (T) as a carrier vehicle which includes the container (C), and is separable from the trailer head. The refrigeration unit (10) is provided in front of the container (C), and the engine-generator unit (20) is provided in front of the refrigeration unit (10).

As shown in FIG. 2, the refrigeration apparatus (11) includes a closed refrigerant circuit (5). The refrigerant circuit (5) includes a fixed-capacity electric compressor (12), a condenser (13), an electronic expansion valve (14), an evaporator (15), and a proportional inlet valve (18) which are sequentially connected through pipes. A condenser fan (16) is provided near the condenser (13), and an evaporator fan (17) is provided near the evaporator (15).

The electric compressor (12) is a scroll compressor. The proportional inlet valve (18) is provided in a pipe on an inlet side of the electric compressor (12), and an amount of a refrigerant introduced into the electric compressor (12) is adjusted by adjusting the degree of opening of the proportional inlet valve (18), thereby controlling refrigeration capacity. The condenser fan (16) introduces air outside the container (C) (outdoor air) to the condenser (13), and the evaporator fan (17) introduces air inside the container (C) (indoor air) to the evaporator (15).

The refrigerant circuit (5) is configured to perform a vapor compression refrigeration cycle by circulating a refrigerant. Thus, in the refrigerant circuit (5), the refrigerant discharged from the electric compressor (12) is condensed through heat exchange with the outdoor air in the condenser (13), is decompressed by the electronic expansion valve (14), and is evaporated through heat exchange with the indoor air in the evaporator (15). Thus, the air inside the container (C) is cooled.

As shown in FIG. 3, the engine-generator unit (20) feeds power to the refrigeration unit (10) to drive the refrigeration apparatus (11). The engine-generator unit (20) includes a generator engine (21), a power generator (22), a converter (23), and an inverter (24).

The power generator (22) is mechanically connected to the generator engine (21), and is driven by the generator engine (21) to generate power. The generator engine (21) is exclusive for the refrigeration apparatus (11), and is different from the drive engine for driving the powered vehicle. A degree of opening of a throttle of the generator engine (21) is adjusted to adjust an amount of fuel fed to the engine, thereby controlling the speed of rotation of the engine.

The converter (23) is electrically connected to the power generator (22). The converter (23) receives alternating current power generated by the power generator (22), and converts the alternating current power to direct current power. The inverter (24) is electrically connected to the converter (23). The inverter (24) receives the direct current power from the converter (23), and converts the direct current power to the alternating current power. The inverter (24) outputs (feeds) the alternating current power (e.g., power of 60 Hz) to the refrigeration apparatus (11) through the power line (35). In the refrigeration apparatus (11), the power fed from the inverter (24) drives the electric compressor (12) etc. Specifically, the converter (23) and the inverter (24) of the present embodiment constitute a power converter.

In the engine-generator unit (20), the converter (23) and the inverter (24) as the power converter are connected between the power generator (22) and the refrigeration apparatus (11). This allows control of the speed of rotation of the generator engine (21). Thus, the generator engine (21) can be driven at an optimum efficiency.

The engine-generator unit (20) includes a rotation speed detector (26) for detecting the speed of rotation of the generator engine (21), and an engine controller (25) for controlling operation of the generator engine (21), and controlling the outputs of the converter (23) and the inverter (24).

The engine controller (25) controls the drive of the generator engine (21) based on the speed of rotation detected by the rotation speed detector (26). The engine controller (25) controls the drive of the generator engine (21) based on a load signal (S) containing load information indicating a magnitude of a refrigeration load of the refrigeration apparatus (11). This will be described in detail below.

The refrigeration unit (10) includes the refrigeration apparatus (11) for cooling the inside of the container (C), and a refrigeration apparatus controller (31) for controlling operation of the refrigeration apparatus (11). The refrigeration apparatus controller (31) receives a target temperature, an indoor temperature, an outdoor temperature, a temperature of a discharge pipe of the electric compressor (12), etc. The refrigeration apparatus controller (31) calculates the refrigeration load of the refrigeration apparatus (11) based on the temperatures, and generates the load signal (S) containing the load information indicating the magnitude of the calculated refrigeration load.

The parameters for calculating the refrigeration load of the refrigeration apparatus (11) may include a difference between a temperature of the refrigerant introduced into the electric compressor (12) and a set temperature of the refrigerant, a value of power or current fed to the electric compressor (12), a difference between an evaporation temperature and a target evaporation temperature in the evaporator (15), an operating frequency of the electric compressor (12), etc.

The refrigeration apparatus controller (31) includes a communication device (32) for communicating with the engine-generator unit (20). The communication device (32) outputs the load signal (S) to the engine-generator unit (20). Specifically, the communication device (32) is connected to the power line (35), and the load signal (S) output from the communication device (32) is input to a receiving communication device (33) provided in the engine controller (25) of the engine-generator unit (20) through the power line (35).

Specifically, the power line (35) functions as a power feed line through which the power is fed from the inverter (24) to the refrigeration apparatus (11), and as a signal feed line through which the load signal (S) is sent from the communication device (32) to the engine controller (25).

In the present embodiment, the power line (35) is described as a communication medium for sending the load signal (S). However, the present invention is not limited to this example, and the load signal (S) may be sent via wireless communication.

When the engine controller (25) receives the load signal (S) containing the load information indicating the magnitude of the refrigeration load of the refrigeration apparatus (11), the engine controller (25) derives the speed of rotation at which a rate of fuel consumption of the generator engine (21) is minimized, and an operating efficiency of the power generator (22) is maximized, based on the load signal (S). Then, the degree of opening of the throttle of the generator engine (21) is adjusted to adjust the amount of fuel fed to the engine so that the generator engine (21) is driven at the derived speed of rotation.

In this structure, the speed of rotation of the generator engine (21) can be controlled based on the load signal (S) sent from the refrigeration apparatus controller (31), and the generator engine (21) can be driven by an output appropriate to the refrigeration load. This can prevent the generator engine (21) from being driven by an output higher than necessary, although the refrigeration load of the refrigeration apparatus (11) is low. Thus, waste of the fuel by the generator engine (21) can be prevented, and the generator engine (21) can be more energy efficient. This can make the entire system more energy efficient.

The refrigeration apparatus controller (31) is configured to determine that the load of the generator engine (21) is not normal when the output of the inverter (24) input to the electric compressor (12) is higher than a predetermined threshold. When such a determination is made, the refrigeration apparatus controller (31) reduces a capacity of the electric compressor (12) of the refrigeration apparatus (11). Specifically, the refrigeration apparatus controller (31) reduces an operating frequency of the electric compressor (12). The electric compressor (12) may be stopped in some cases.

In this structure, when the output of the inverter (24) exceeds the predetermined threshold, refrigeration capacity of the refrigeration apparatus (11) can be reduced to reduce power required by the power generator (22), and power required by the generator engine (21), thereby reducing the speed of rotation of the generator engine (21). Thus, even when the output of the generator engine (21) is reduced through transportation at high altitudes or degradation over time, abnormal increase in speed of rotation of the generator engine (21) can be prevented, and stall and stop of the generator engine (21) can be prevented.

The predetermined threshold can be determined based on an oil temperature of the generator engine (21). The oil temperature is a temperature of lubricant oil in the generator engine (21). In the present embodiment, the predetermined threshold may be determined based on a water temperature in place of the oil temperature. The water temperature is a temperature of water for cooling the generator engine (21). The predetermined threshold may be determined based on a total operation time of the generator engine (21) in place of the oil temperature or the water temperature. In this case, the generator engine (21) can be operated in consideration of reduction in output through degradation over time.

—Working Mechanism—

Figure 4:
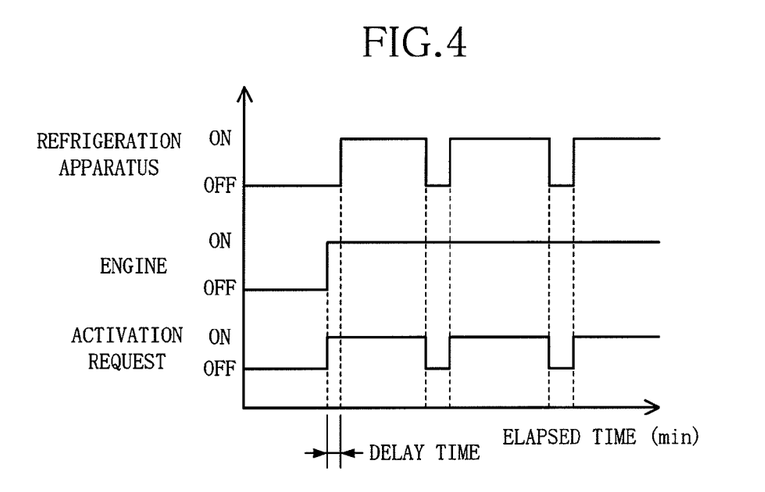
FIG. 4 is a timing chart illustrating timings of activating the refrigeration apparatus and a generator engine.

A working mechanism of the engine-generator unit (20) of the first embodiment will be described below. As shown in FIG. 4, a request to activate the refrigeration apparatus (11) is input, and the engine controller (25) activates the generator engine (21) in response to the activation request. When the generator engine (21) is activated, the power generator (22) is driven by power of the generator engine (21) to generate power. The generated alternating current power is converted to the direct current power by the converter (23), and is output to the inverter (24). The inverter (24) re-converts the direct current power to the alternating current power, and then the power is fed to the refrigeration apparatus (11) after a predetermined delay time has elapsed.

Thus, the power can stably be fed to the refrigeration apparatus (11) after the generator engine (21) is activated, and the power generated by the power generator (22) is stabilized. The delay time may be set by a timer in advance, or may be determined based on time taken for the output to reach ±5% of a target voltage, or time taken for the speed of rotation of the generator engine (21) to reach ±5% of the target speed of rotation, etc.

As shown in FIGS. 2 and 3, in the refrigeration apparatus (11), the fed alternating current power is output to the electric compressor (12) and the fans (16, 17). Thus, the electric compressor (12) and the fans (16, 17) are driven, and a vapor compression refrigeration cycle is performed in the refrigerant circuit (5).

In the above-described operation state, the refrigeration apparatus controller (31) controls the electric compressor (12) and the fans (16, 17) of the refrigeration apparatus (11). The engine controller (25) controls the speed of rotation of the generator engine (21).

Specifically, each of the electric compressor (12) and the fans (16, 17) is driven at the speed of rotation appropriate to the required refrigeration capacity (the magnitude of the refrigeration load) derived by the refrigeration apparatus controller (31). At this time, the load signal (S) containing the load information indicating the magnitude of the refrigeration load is output to the engine controller (25) through the power line (35).

To perform cooling operation of the refrigeration apparatus (11), the operation of the refrigeration apparatus (11) may temporarily be stopped by turning the request to activate the refrigeration apparatus (11) off when the temperature inside the container (C) is reduced to a temperature for the cooling operation or lower. This can make the entire refrigeration system more energy efficient.

Figure 5:
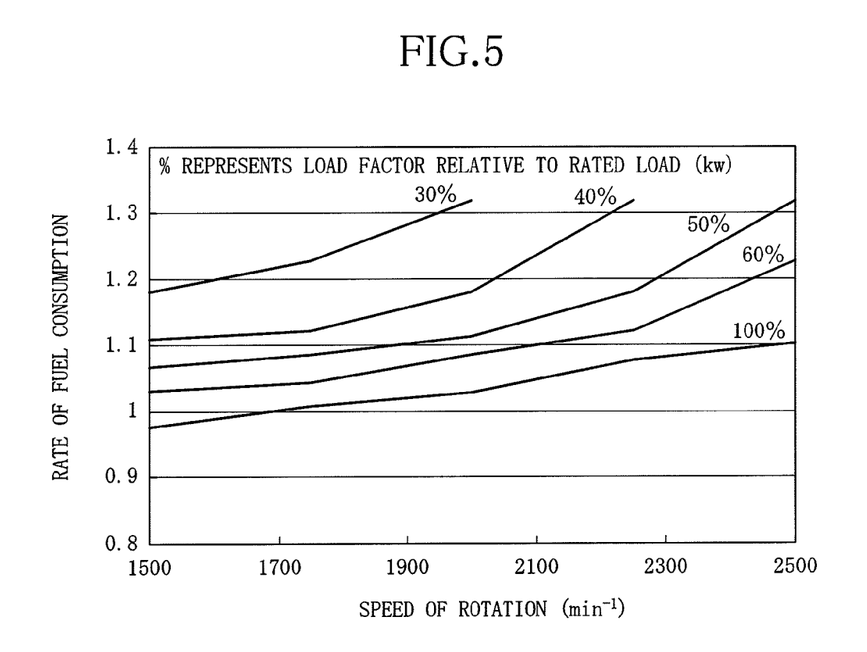
FIG. 5 is a graph of fuel consumption rate of the generator engine versus load.

The engine controller (25) calculates a load factor based on the load signal (S), and derives the speed of rotation at which the rate of fuel consumption is minimized under the calculated load based on a graph shown in FIG. 5.

For example, when a target indoor temperature is greatly reduced in refrigerating operation at a rated output (1700 rpm, 10 kW), the following operation is performed. Since the indoor temperature is greatly different from the target indoor temperature, the refrigeration apparatus controller (31) commands the inverter (24) to generate the highest refrigeration capacity. As a result, the power consumption increases, and the converter (23) produces the power from the power generator (22) to feed the power appropriate to the power consumption. Then, a load torque of the generator engine (21) increases, and the speed of rotation decreases when the amount of fuel is kept unchanged. Thus, the engine controller (25) feeds more fuel to maintain the speed of rotation.

For example, if the load is 6 kW, which corresponds to a load factor of 60%, the rate of fuel consumption at 1700 rpm can be read on a plot of 60% load factor shown in the graph of FIG. 5 (about 1.04). The plot of 60% load factor indicates that the lowest rate of fuel consumption is about 1.03 at 1500 rpm or lower. Thus, the engine controller (25) commands the speed of rotation of 1500 rpm. As a result, an increase in rate of fuel consumption by 0.01 can be expected.

When the inside of the container is well cooled, and the remaining heat load is only heat transferred from the outside through a container wall etc., the power required by the electric compressor (12) and the fans (16, 17) is reduced. In this case, as described above, the graph indicates that the rate of fuel consumption is preferably low when the load factor is low, and the rate of fuel consumption can be reduced by setting the speed of rotation low. However, the speed of rotation has a lower limit, and the engine should be driven in a limited range above the lower limit. Thus, the generator engine (21) can be driven in the most energy efficient manner.

Figure 6:
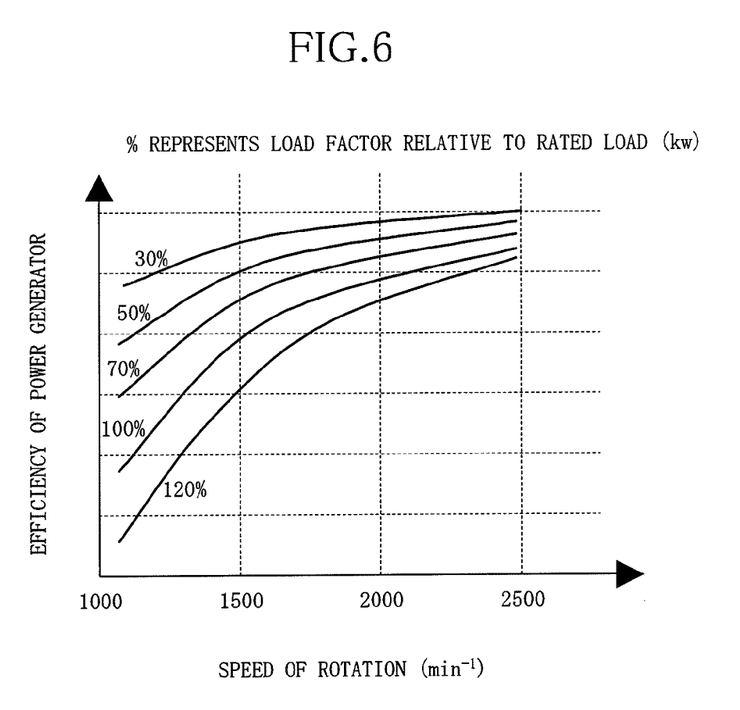
FIG. 6 is a graph of efficiency of a power generator.

The engine controller (25) calculates the load factor based on the load signal (S), and the speed of rotation at which the efficiency of the power generator (22) is the highest under the load condition is calculated based on a graph of FIG. 6. FIG. 6 shows the efficiency of the power generator versus the speed of rotation of the power generator (22) and the load factor. The graph indicates that the efficiency of the power generator (22) increases with increase in speed of rotation.

The efficiency of the generator engine (21) is increased by reducing the speed of rotation as much as possible when the load factor is low. However, the efficiency of the power generator (22) tends to decrease as the speed of rotation decreases. Since the generator engine (21) and the power generator (22) are directly connected, or indirectly connected through a belt or a gear, their speeds of rotation are proportional. For this reason, considering both of the rate of fuel consumption which is the lower the better, and the efficiency of the power generator which is the higher the better, the optimum output of the generator engine (21) to the power generator (22) at a certain load factor can be obtained by finding the speed of rotation at which $$\text{Total Efficiency Coefficient} = \text{Efficiency of Power Generator} \div \text{Rate of Fuel Consumption}$$

is maximized. Giving a command indicating the speed of rotation at which the total efficiency coefficient is maximized allows the most fuel efficient operation of the power generation system.

When the container (C) is transported at high elevations, the output of the generator engine (21) decreases due to low atmospheric pressure. In this case, the voltage output by the power generator (22) increases more than necessary. When the output of the power generator (22) input to the refrigeration apparatus (11) is higher than the predetermined threshold, the refrigeration apparatus controller (31) determines that the load of the generator engine (21) is not normal. When such a determination is made, the refrigeration apparatus controller (31) reduces the operating frequency of the electric compressor (12). This apparently reduces the refrigeration load of the refrigeration apparatus (11). Then, the load signal (S) indicating that the refrigeration load is reduced is output to the engine controller (25), and the engine controller (25) reduces the speed of rotation of the generator engine (21). This can prevent decrease in the rate of fuel consumption of the generator engine (21).

Advantages of First Embodiment

In the container refrigeration system (1) of the first embodiment of the present invention described above, the speed of rotation of the generator engine (21) is controlled based on the load signal (S) containing the load information indicating the magnitude of the refrigeration load of the refrigeration apparatus (11) calculated by the refrigeration apparatus controller (31). Thus, the generator engine (21) can be driven by the output corresponding to the refrigeration load. Specifically, the generator engine (21) can be prevented from being driven by power higher than necessary, although the refrigeration load is low. Thus, waste of fuel by the generator engine (21) can be prevented, and the generator engine (21) can be more energy efficient. This can make the entire engine-generator unit (20) more energy efficient.

Second Embodiment

Figure 7:
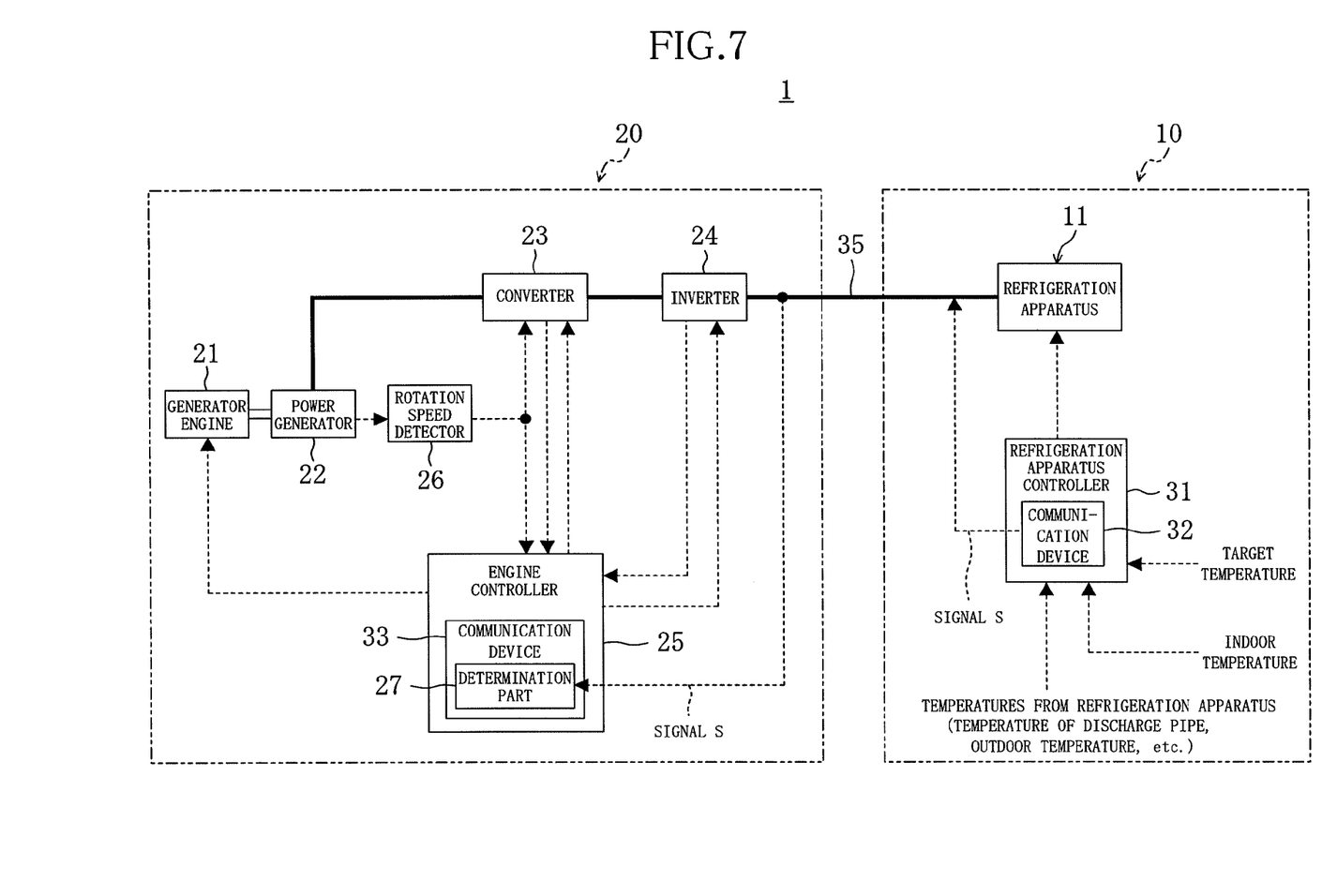
FIG. 7 is a schematic diagram of a general structure of a refrigeration system according to a second embodiment.

FIG. 7 is a schematic diagram illustrating a general structure of a refrigeration system of a second embodiment. The second embodiment is different from the first embodiment in that the engine controller (25) includes a determination part (27). The same components as those of the first embodiment will be indicated by the same reference characters, and only the difference will be described below.

As shown in FIG. 7, the refrigeration apparatus controller (31) includes a communication device (32) for communicating with an engine-generator unit (20). The communication device (32) outputs a load signal (S) to the engine-generator unit (20). Specifically, the communication device (32) is connected to a power line (35), and the load signal (S) output from the communication device (32) is input to a receiving communication device (33) provided in an engine controller (25) of the engine-generator unit (20) through the power line (35).

The communication device (33) of the engine controller (25) includes a determination part (27). The determination part (27) determines whether or not the load signal (S) containing load information readable by the engine controller (25) is sent from the refrigeration apparatus controller (31).

Specifically, when the load signal (S) is input to the determination part (27), and the load information can be read out of the load signal (S), it is determined that the readable load signal (S) has been sent from the refrigeration apparatus controller (31).

The engine controller (25) derives the speed of rotation of the engine at which the rate of fuel consumption of the generator engine (21) is minimized, and the operating efficiency of the power generator (22) is maximized, based on the load signal (S). Then, the degree of opening of the throttle of the generator engine (21) is adjusted to adjust an amount of fuel fed to the generator engine (21) so that the generator engine (21) can be driven at the derived speed of rotation.

Figure 8:
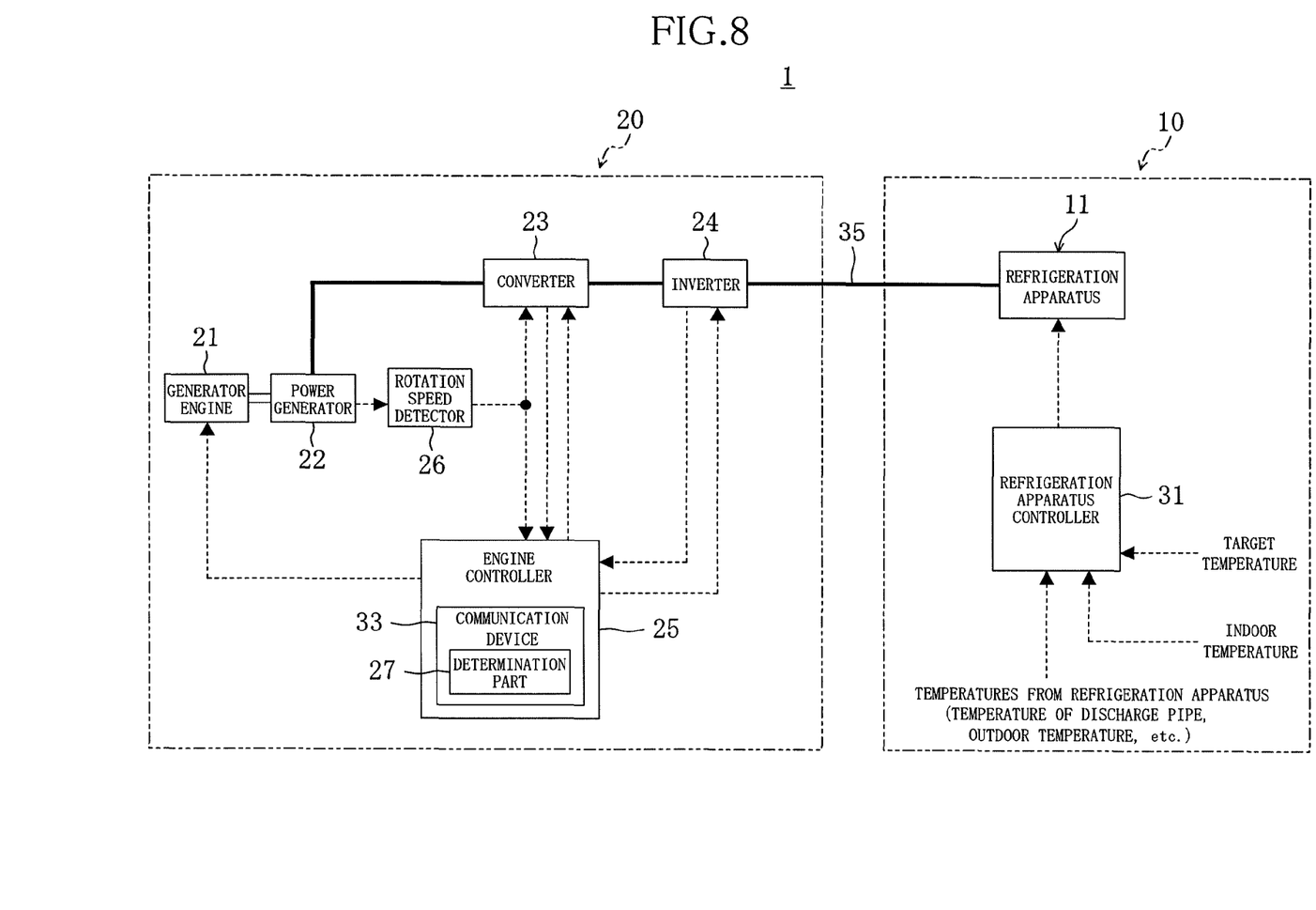
FIG. 8 is a schematic diagram of another structure of the refrigeration system.

When the load signal (S) is input to the determination part (27), and the engine controller (25) is not able to read the load information from the load signal (S), or when the refrigeration apparatus controller (31) does not include the communication device (32) as shown in FIG. 8, it is determined that the readable load signal (S) has not been sent from the refrigeration apparatus controller (31).

In this case, the engine controller (25) derives the speed of rotation of the engine at which the rate of fuel consumption of the generator engine (21) is minimized, and the operating efficiency of the power generator (22) is maximized, based on the output of the inverter (24). Then, the degree of opening of the throttle of the generator engine (21) is adjusted to adjust the amount of fuel fed to the generator engine (21) so that the generator engine (21) can be driven at the derived speed of rotation. Specifically, when it is determined that the readable load signal (S) has not been sent, the output of the inverter (24) is regarded as the refrigeration load of the refrigeration apparatus (11). Thus, the engine controller (25) controls the speed of rotation of the generator engine (21) based on the magnitude of the refrigeration load of the refrigeration apparatus (11).

Advantages of Second Embodiment

In the container refrigeration system (1) according to the second embodiment of the present invention described above, the determination part (27) determines whether or not the load signal (S) containing the load information readable by the engine controller (25) is sent from the refrigeration apparatus controller (31). When it is determined that the readable load signal (S) has been sent, the speed of rotation of the generator engine (21) is determined based on the load signal (S). When it is not determined that the readable load signal (S) has not been sent, the refrigeration load is estimated by the output of the inverter (24), and the speed of rotation of the generator engine (21) is controlled based on the estimated load. In this way, the generator engine (21) can be driven by the output corresponding to the refrigeration load.

This can prevent the generator engine (21) from being driven by an output higher than necessary, although the refrigeration load of the refrigeration apparatus (11) is low. Thus, waste of fuel by the generator engine (21) can be prevented, and the generator engine (21) can be more energy efficient. This can make the entire system more energy efficient.

Other Embodiments

The above embodiments may be modified in the following manner.

In the embodiments described above, the refrigeration apparatus controller (31) may gradually increase the operating frequency of the electric compressor (12), or may adjust the degree of opening of the proportional inlet valve (18), after receiving the request to activate the refrigeration apparatus (11), to gradually increase the amount of the circulating refrigerant. This allows operating the refrigeration apparatus (11) while keeping the output of the electric compressor (12) low, or keeping the amount of the refrigerant circulating in the refrigerant circuit (5) small, until the power generated by the power generator (22) is stabilized after the generator engine (21) is activated upon receiving the request to activate the refrigeration apparatus (11).

In the embodiments described above, the container refrigeration system (1) including the refrigeration unit (10) and the engine-generator unit (20) is applied to the trailer (T) for transporting the container (C) by land. However, the present invention is not limited to this example. For example, the container refrigeration system may also be applicable to trains and trucks for transporting the container (C) by land.

The refrigeration unit (10) and the engine-generator unit (20) may be formed with separate units, or an integrated unit.

INDUSTRIAL APPLICABILITY

As described above, the present invention is useful for a container refrigeration system which generates power by an engine, and feeds the generated power to a refrigeration apparatus.

DESCRIPTION OF REFERENCE CHARACTERS

1 Container refrigeration system
5 Refrigerant circuit
11 Refrigeration apparatus
12 Electric compressor
18 Proportional inlet valve (proportional control valve)
21 Generator engine
22 Power generator
23 Converter
24 Inverter
25 Engine controller
27 Determination part (determination section)
31 Refrigeration apparatus controller
35 Power line
C Container
S Signal

The invention claimed is:

1. A container refrigeration system comprising:
   a generator engine for driving a power generator;
   a refrigeration apparatus for cooling an inside of a container (C);
   a refrigeration apparatus controller for controlling operation of the refrigeration apparatus, said refrigeration apparatus controller calculating a magnitude of a refrigeration load of said refrigeration apparatus as a numerical value based on at least one of the following parameters:
   a difference between a temperature of refrigerant and a set temperature of refrigerant,
   a value of power or current fed to an electric compressor in said refrigeration apparatus,
   a difference between an evaporation temperature and a target evaporation temperature in an evaporator in said refrigeration apparatus, and
   an operating frequency of the electric compressor;
   a converter for converting alternating current power generated by the power generator to direct current power; and
   an inverter for converting the direct current power of the converter to the alternating current power, and feeding the alternating current power to the refrigeration apparatus through a power line, wherein
   the container refrigeration system includes an engine controller for controlling a speed of rotation of the generator engine by receiving from the refrigeration apparatus an information signal (S) whose content includes said magnitude of said refrigeration load of the refrigeration apparatus calculated by said refrigeration apparatus controller, and by calculating a load factor corresponding to said magnitude, said engine controller including a communication device for receiving said information signal (S) via a communication medium from a communication device in said refrigeration apparatus controller.

2. The container refrigeration system of claim 1, wherein
   the engine controller includes a determination section which determines whether or not the information signal (S) containing the load information readable by the engine controller has been sent from the refrigeration apparatus controller, and
   the engine controller is configured to obtain the refrigeration load by extracting the magnitude of the refrigeration load from the information signal (S) if the information signal (S) is determined to have been sent, and by estimating the refrigeration load from an output of the inverter if the information signal is determined not to have been sent, the engine controller being further configured to control the speed of rotation of the generator engine based on the obtained refrigeration load,
   wherein the engine controller extracts the magnitude of the refrigeration load from the information signal (S) when the determination by the determination section indicates that the readable information signal (S) has been sent, and
   wherein the engine controller estimates the refrigeration load from the output of the inverter when the determination by the determination section indicates that the readable information signal (S) has not been sent.

3. The container refrigeration system of claim 1, wherein
   the engine controller is configured to activate the generator engine upon receiving a request to activate the refrigeration apparatus, and to start feeding of power to the refrigeration apparatus after a predetermined delay time has elapsed.

4. The container refrigeration system of claim 1, wherein
   the refrigeration apparatus includes an electric compressor driven by an output of the inverter, and
   the refrigeration apparatus controller is configured to gradually increase an operating frequency of the electric compressor after receiving a request to activate the refrigeration apparatus.

5. The container refrigeration system of claim 1, wherein
   the refrigeration apparatus includes a proportional control valve for adjusting a flow rate of a refrigerant circulating in a refrigerant circuit, and
   the refrigeration apparatus controller is configured to gradually increase the flow rate of the circulating refrigerant by adjusting a degree of opening of the proportional control valve after receiving a request to activate the refrigeration apparatus.

6. The container refrigeration system of claim 1, wherein
   the refrigeration apparatus includes an electric compressor driven by an output of the inverter, and
   the refrigeration apparatus controller is configured to gradually reduce an operating frequency of the electric compressor when the output of the inverter exceeds a predetermined threshold.

* * * * *